(No Model.)  2 Sheets—Sheet 1.

S. RAYMOND.
WEIGHT POWER.

No. 286,962.  Patented Oct. 16, 1883.

WITNESSES:  
John C. Deemer  
C. Sedgwick

INVENTOR:  
S. Raymond  
BY Munn & Co.  
ATTORNEYS.

(No Model.)  S. RAYMOND.  2 Sheets—Sheet 2.
WEIGHT POWER.

No. 286,962.  Patented Oct. 16, 1883.

WITNESSES:

INVENTOR:
S. Raymond
BY Munn & Co
ATTORNEYS.

UNITED STATES PATENT OFFICE.

SQUIRE RAYMOND, OF EAST VENICE, NEW YORK.

WEIGHT-POWER.

SPECIFICATION forming part of Letters Patent No. 286,962, dated October 16, 1883.

Application filed July 24, 1883. (No model.)

*To all whom it may concern:*

Be it known that, SQUIRE RAYMOND, of East Venice, in the county of Cayuga and State of New York, have invented a new and Improved Weight-Power, of which the following is a full, clear, and exact description.

This invention relates to a weight-power arranged for transmitting rotary and reciprocating motion, and is intended more especially for operating small machinery, such as wood-turning lathes, churns, fanning-mills, pumps, &c.

The invention consists in the combination and arrangement of parts, substantially as hereinafter more fully set forth and claimed.

Reference is to be had to the accompanying drawings, forming part of this specification, in which similar letters of reference indicate corresponding parts in all the figures.

Figure 1:
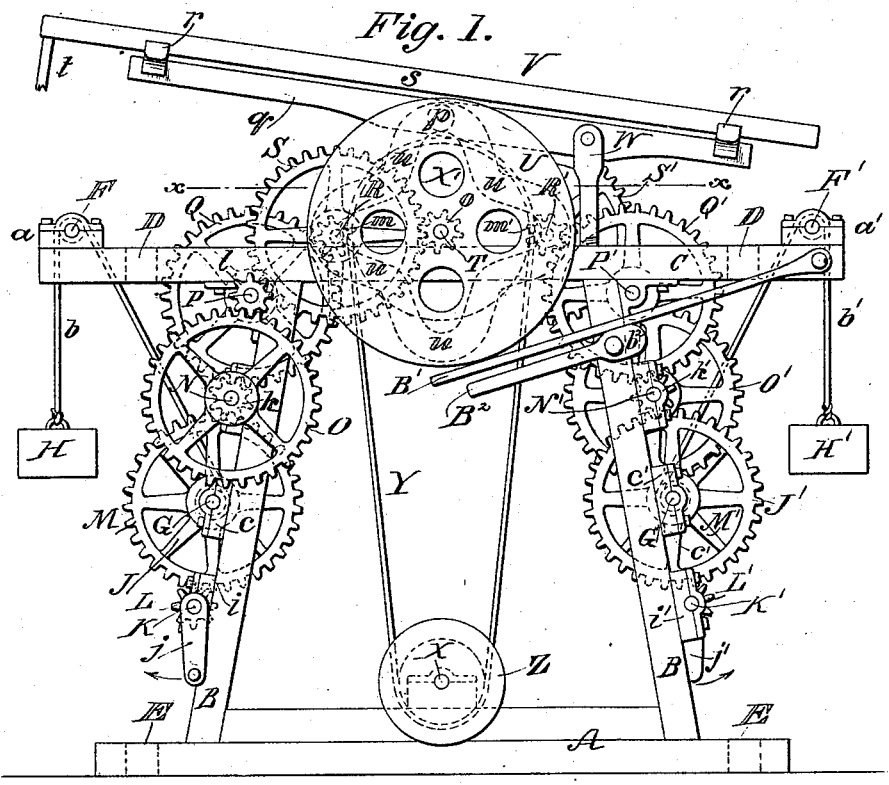
Figure 2:
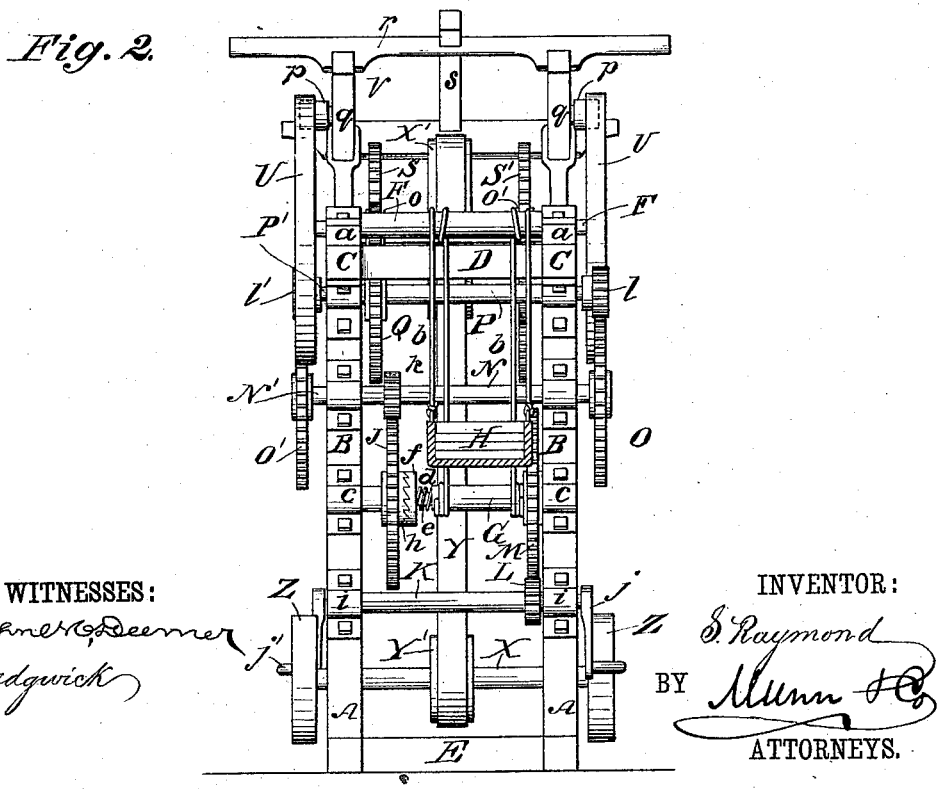
Figure 3:
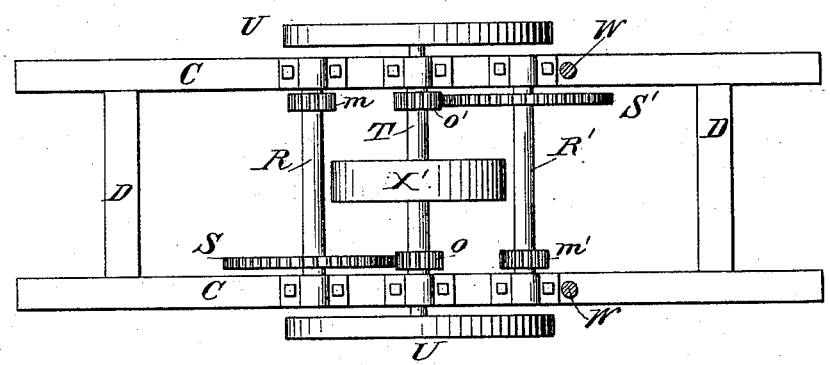
Figure 4:
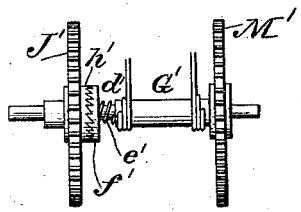

Figure 1 is a side elevation of my new and improved weight-power machine. Fig. 2 is an end elevation of the machine. Fig. 3 is a sectional plan view taken on the line $x\ x$ of Fig. 1, only a part of the gearing being shown; and Fig. 4 is a detailed view of one of the winding-drums.

The frame of the machine is composed of the two sills A, four inclined uprights, B, the two beams C, the two upper cross-pieces, D, that tie the beams C together, and the two lower cross-pieces, E, that tie the sills A together.

Journaled in suitable bearings, $a\ a$, placed upon the beams C, at or near their ends, are the rollers F F, over which the weight-ropes $b\ b'$ pass on the way to the winding shafts or drums G G', to which they are attached. The weight-ropes $b\ b'$ are by preference coiled once around the rollers F F', as shown in Fig. 2, and attached to the outer ends of the weight-ropes $b\ b'$ are the boxes H H', in which stones, bricks, pieces of iron, or other loose heavy material may be placed in suitable quantities to cause the machine to run and perform the work desired. The winding shafts or drums G G' are journaled, respectively, at opposite ends of the machine in the bearings $c\ c$ and $c'\ c'$, secured to the uprights B, and these winding shafts or drums G G' are each reduced in size, as shown at $d\ d'$, Figs. 2 and 4. On the reduced portion $d$ of the drum or shaft G is placed loosely the spring $e$, sliding clutch $f$, and cog-wheel J, which latter is loose upon the shaft, except as held by the teeth of the clutch $f$, engaging with the corresponding teeth, $h$, formed upon the hub of the said cog-wheel. On the reduced portion $d'$ of the shaft or drum G' is placed the spring $e'$, sliding clutch $f'$, and the cog-wheel J', which is loose upon the shaft, except as held by the teeth of the clutch engaging with the teeth $h'$, formed upon the hub of the said cog-wheel, as shown in Fig. 4, and also upon the shafts or drums G G' are secured, respectively, the large cog-wheels M M'. These are for turning the drums G G', for winding up the ropes $b\ b'$ and elevating the weights, and for this purpose mesh, respectively, with the pinions L L', secured, respectively, upon the shafts K K', journaled below the drums G G' in bearings $i\ i$ and $i'\ i'$, secured to the uprights B. The crank-shafts K K' are provided outside of the frame of the machine with the cranks $j\ j'$, by which the shafts K K' may be turned by hand in the direction of the arrows. This motion of the shafts K K' will impart a reverse motion to the winding-drums G G', which reverse motion is permitted by the sliding clutches $f\ f'$, so that in winding up the ropes $b\ b'$ for elevating the weights the winding-drums run entirely independent of the cog-wheels J J' and the other parts of the machine, so that but little exertion in elevating the weights will be required. As soon as all turning force is removed from the cranks $j\ j'$ the clutches $f\ f'$ immediately and automatically lock with the clutch-teeth on the hubs of the wheels J J', and thus apply the power of the weights to the operative parts of the machine through the double train of gearing, next described.

Above the winding drums or shafts G G' are journaled, at opposite ends of the machine, in suitable bearings attached to the uprights B, the shafts N N'. These shafts are provided, respectively, inside of the frame of the machine with the pinions $k\ k'$, which mesh with the cog-wheels J J' upon the winding-drums G G', and outside of the frame of the machine these shafts N N' are provided, respectively, with the large cog-wheels O O'.

Above the shafts N N' are journaled, in like manner at opposite ends of the machine, in suitable bearings attached to the uprights B, the shafts P P'. These shafts are provided, respectively, inside of the frame of the machine with large cog-wheels Q Q', and outside of the frame these shafts are provided, respectively, with the pinions l l', which mesh, respectively, with the cog-wheels O O' on the shafts N N' below.

Above the shafts P P' are journaled, in suitable bearings placed upon the beams C C, the shafts R R'. These shafts are provided, respectively, inside of the frame of the machine with the pinions m m', which mesh with the large cog-wheels Q Q' on shafts P P', and also inside of the frame of the machine the shafts R R' are provided, respectively, with the large cog-wheels S S', which mesh, respectively, with the pinions o o', secured upon the main central power-shaft T, so that through the double sets or trains of gearing just described the weights H H' both apply their force to revolve this single shaft T.

U U are the cams, attached to the ends of the power-shaft T for reciprocating the lever or frame V, for communicating an up and down movement to the dasher of a reciprocating dash-churn, for example, or other machine. The lever or frame V is pivoted to and between the uprights W W, secured in the beams C C of the frame of the machine, and the cams U U are grooved in this instance, as seen at $u$ in dotted lines, Fig. 1, to give four reciprocations to the frame or lever V for each revolution of the power-shaft T, and the motion is communicated from the cams U U to the frame V by means of the cam-rollers $p$ $p$, attached to the side pieces, $q$ $q$, of the frame V, which rollers run in the grooves $u$ of the cams U U, as will be understood from the drawings. The frame V is composed of the said side pieces, $q$ $q$, and cross-pieces $r$ $r$, and central longitudinally-placed bar, $s$, to one end of which is attached the rod $t$, for connecting the power with the machine to be operated.

Journaled immediately below the power-shaft T, in suitable boxes placed upon the sills A A of the main frame of the machine, is the shaft X. This is adapted to be revolved from the power-shaft T by the belt Y, that passes over pulley X', placed upon the center of the power-shaft T, and pulley Y', placed upon the center of the shaft X. At its ends the shaft X is provided with the pulleys Z Z, over which belts may be placed for causing the power to transmit rotary motion to a rotary churn, for example, or to a fanning-mill, grindstone, or other machine or device.

B' represents the brake-bar. This is pivoted to the outside of one of the beams C of the main frame of the machine, and acts upon the periphery of one of the cams U, and it is operated to exert greater or less pressure upon the edge of the cam U, to regulate the speed of the power to the work being performed by the cam-lever $B^2$, pivoted to the outside of one of the uprights B, so that the cam or eccentric portion $b^2$ thereof, by moving downward the free end of the lever $B^2$, will lift the brake-bar B' and cause it to press with greater or less force against the cam U, and thus effect its purpose.

To use my new weight-power it is only necessary to place the required amount of loose weights of brick, stone, iron, or other heavy material in the boxes H H', and to apply the hand to the cranks $j$ $j$ and elevate the weights, and then to attach the power either by belts passing over the pulleys Z Z, if the machine to be driven is a rotary machine, or by the connecting-rod $t$, if the machine to be driven is a reciprocating machine. The machine can then be regulated according to the work being done either by removing weight from or adding weight to the boxes H H', or by regulating the brake B' $B^2$, and the machine can then be left to perform its own work, the attendant returning only to wind up the weights again when they shall have run down. In this manner it will be seen that the machine is very practical and useful, and it is also cheap and durable, and may be operated by anybody.

I do not abandon or dedicate to the public any patentable feature set forth herein and not hereinafter claimed; but reserve the right to claim the same either in a reissue of any patent that may be granted upon this application or in other applications for Letters Patent that I may make.

Having thus described my invention, what I claim as new, and desire to secure by Letters Patent, is—

1. In a weight-power, the power-shaft T, provided with the cams U, combined with the frame V, pivoted between standards, and having studs $p$, engaging with the grooves of the cam for transmitting reciprocating motion, substantially as described.

2. In a weight-power, the power-shaft T, provided with cams U, in combination with the frame V, pivoted between standards, and having studs $p$, engaging with the grooves of the cam, and the shaft X, for transmitting rotary motion, substantially as described.

3. In a weight-power, the winding-drums G G', provided with the clutch-wheels J J', clutches $f$ $f'$, springs $e$ $e'$, and large cog-wheels M M', said drums having attached to them weighted ropes $b$ $b'$, which are passed over sleeves F F', in combination with the crank-shafts K K', having pinions L L', that mesh with the cog-wheels M M', shafts N N', carrying the pinions $k$ $k'$ and wheels O O', shafts P P', having the pinions $l$ $l'$ and wheels Q Q', and shafts R R', carrying pinions $m$ $m'$ and wheels S S', engaging with pinions $o$ $o'$ of the power-shaft T, provided with the cam U and pulley X', substantially as and for the purposes set forth.

SQUIRE RAYMOND.

Witnesses:
EDWIN RAYMOND,
MELVILLE M. CRANE.